April 20, 1948. W. F. SCHACHT 2,440,023
CATTLE MARKER
Filed Oct. 24, 1945 2 Sheets-Sheet 1

Inventor
William F. Schacht
By Brandes Nowell
Attorneys

April 20, 1948. W. F. SCHACHT 2,440,023
CATTLE MARKER
Filed Oct. 24, 1945 2 Sheets-Sheet 2

Inventor
William F. Schacht
By
Attorneys

Patented Apr. 20, 1948

2,440,023

UNITED STATES PATENT OFFICE 2,440,023

CATTLE MARKER

William F. Schacht, Huntington, Ind.

Application October 24, 1945, Serial No. 624,267

7 Claims. (Cl. 40—3)

This invention is a novel improvement in cattle markers, comprising a flexible member adapted to encircle the horns of the livestock and carrying a marker plate disposed at the center of the forehead of the livestock, whereby farmers or herdsmen may readily identify same, the present invention being an improvement upon the cattle markers shown in my U. S. Letters Patents Nos. 2,327,823, dated August 24, 1943; 2,327,824, dated August 24, 1943; 2,345,292, dated March 28, 1944; 2,345,293, dated March 28, 1944, and 2,383,419, dated August 21, 1945.

I will explain the invention with reference to the accompanying drawings, which illustrate one practical embodiment thereof to enable others to adopt and use the same; and will summarize in the claims the novel features of construction, and novel combinations of parts, for which protection is desired.

Figure 1:
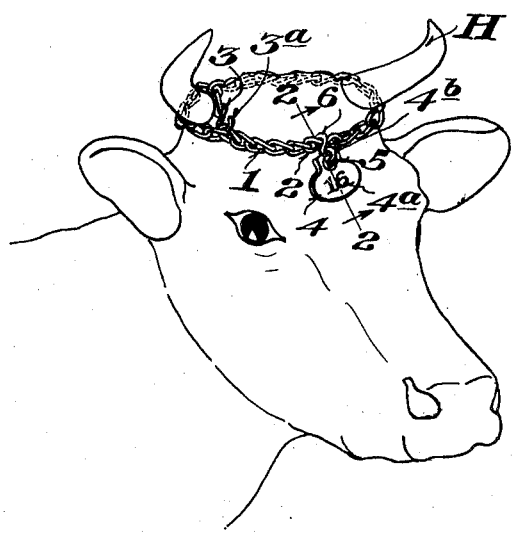
Figure 1 is a perspective view of a cow's head showing my novel horn marker applied thereto.

As shown, my novel marker preferably comprises a flexible member, such as a horn chain 1 adapted to encircle the spaced horns H of the cow or other livestock, said chain having its ends engaged with the eyes of an S-hook, double hook, or link 2, the hook or link being preferably centered on the animal's forehead, as shown in Fig. 1, and the hook or link engaging links adjacent the ends of the chain so that the same will be of such diameter that it cannot be lifted over the horns H of the animal.

S-hook, double hook, or link 2 is preferably formed of heavy round stock and as furnished to the herdsman one eye of the hook or link would be closed in a link at one end of chain 1 while the other eye would be left open to be engaged with a proper or desired link adjacent the opposite end of the chain before closing said open eye to permanently lock the chain 1 around the spaced horns H.

In order to prevent the chain from working circumferentially around the spaced horns which would result in off-centering the S-hook, double hook or link 2 with respect to the cow's head, I preferably provide an auxiliary chain 3, Fig. 1, having hooks 3a at each end, the auxiliary chain 3 passing around the inner side of one horn H and having its hooks 3a engaged and closed in adjacent links of the main horn chain 1. If desired, two auxiliary chains 3 may be provided for engagement with both horns H, instead of the single horn shown. After engagement of the hooks 3a with the links of chain 1 the eyes thereof would be closed. Obviously chain 3 may be of considerably less strength than the main chain 1, since relatively little strain would normally be imposed thereon.

Figure 2:
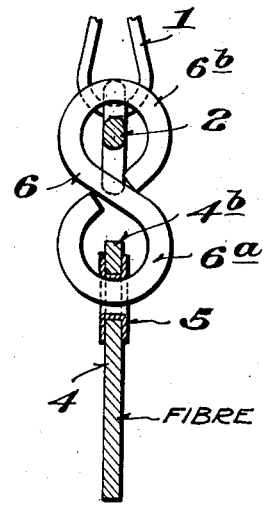
Fig. 2 is an enlarged vertical section on the line 2—2, Fig. 1.

As shown in Figs. 1 and 2 the marker plate 4 may be made of fibre or other non-corrosive material having requisite inherent strength, and the plate 4 bears indicia 4a, such as "16." Marker plate 4 is provided with an integral shank 4b extending from its upper end, and a metallic eyelet 5 is inserted through a hole in shank 4b and its ends riveted over to reinforce the fibre plate 4.

Eyelet 5 receives the lower eye 6a of an S-hook, double hook or link 6, while the upper eye 6b of hook or link 6 is passed around the central portion of the S-hook, double hook or link 2 carried by horn chain 1 as clearly indicated in Figs. 1 and 2, the eyes 6a and 6b being closed so as to permanently secure the plate 4 to the horn chain 1. Eye 6b is of slightly larger diameter than the narrow central portion of hook or link 2 whereby said eye is limited in its lateral movement on the S-hook, double hook or link 2 to such extent that the hook or link 6 remains substantially centered on the forehead of the cow and consequently the marker plate 4 will likewise be centered.

In the above arrangement of interlocking S-hooks, double hooks or links 2 and 6, the upper eye 6b of the hook or link 6 prevents opening of the eyes of the hook or link 2, the hook or link 6 thus making a double lock so that the eyes of hook or link 2 cannot be opened which would permit the horn marker from being removed or lost from the cow's head. Since the chain 1 is anchored against circumferential movement around the spaced horns H by the auxiliary chain 3, and since the hook or link 6 is anchored on the hook or link 2, the marker plate 4 will remain at all times centered on the cow's forehead preventing same from shifting laterally so as to overlie one of the eyes of the animal.

Figure 4:
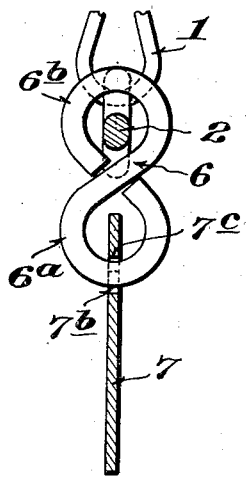
Fig. 4 is a vertical section on the line 4—4, Fig. 3.

If desired the plate 4 may be made of metal as shown at 7 in Figure 4 or other durable metal, preferably non-corrosive, thus dispensing with the use of the eyelet 5 in the marker plate shown in Figs. 1 and 2.

Figure 3:
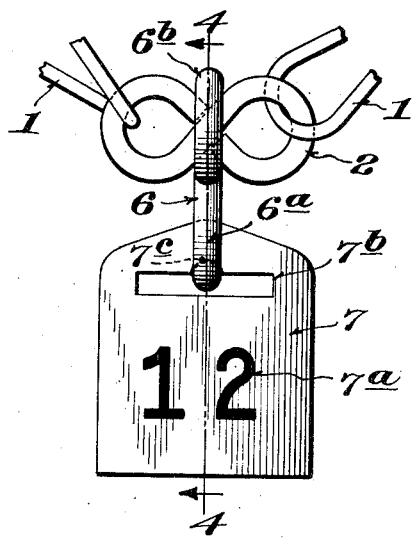
Fig. 3 is a plan view of a modified marker plate used in my horn marker.

In the modification shown in Figs. 3 and 4 a different form of marker plate is shown. In this modification the arrangement of the chain 1, S-hook, double hook or link 2 and interlocking S-hook, double hook or link 6 is the same as in the preceding figures; also the marker plate 7 bears indicia 7a, such as "12," embossed, stamped, engraved, printed or otherwise applied thereto so as to become permanently fixed thereon. Plate 7 however has a transversely disposed slot 7b disposed adjacent its upper end of less width than the diameter of the lower eye 6a of hook or link 6. At the center of the slot 7b is a semicircular recess 7c in its upper edge which receives the thickness of the lower eye 6a of hook or link 6, the connection being such as to prevent the eye 6a of hook or link 6 from shifting laterally with respect to slot 7b.

The provision of the slot 7b provides for free passage of air below the plate 7 when positioned on the animal's forehead; and moreover it is found in actual use that the hair on the forehead of the animal will enter the slot 7b and further assist in anchoring the plate 7 in centered position against lateral swinging movements of the plate, thus preventing the plate from assuming a position over the eye of the animal.

Figure 5:
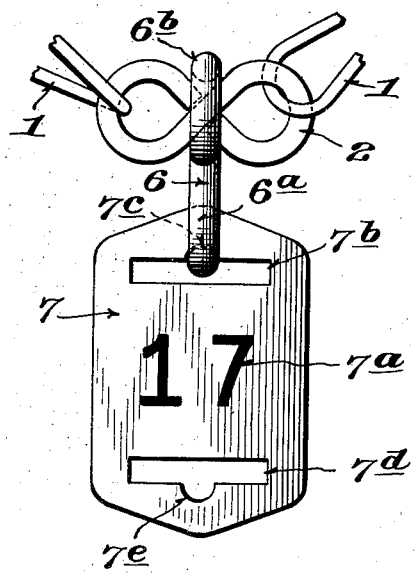
Fig. 5 is a plan view of a further modified form of marker plate used in my horn marker.
Figure 6:
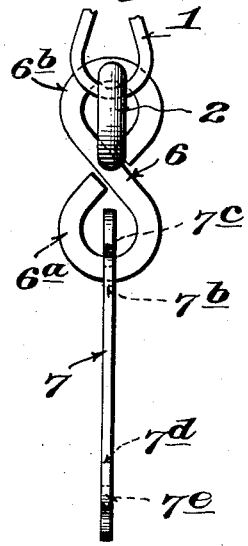
Fig. 6 is a side elevation of the marker plate shown in Fig. 5.

In Figs. 5 and 6 a further modification is shown in which the parts are similar to the parts shown in Figs. 3 and 4. In this modification the plate 7 bears indicia 7a, such as "17," and is provided with the transverse slot 7b adjacent its upper edge, the slot having the semi-circular recess 7c in the center of its upper edge receiving the lower eye 6a, S-hook, double hook or link 6. Plate 7 however is somewhat longer than the plate in Figs. 3 and 4 and is provided with a lower transverse slot 7d similar to the slot 7b for ventilation purposes, the slot 7d having a semi-circular recess 7e in its lower edge whereby a halter strap ring (not shown) may be secured to the plate 17 to receive the snap of a halter strap; or the halter strap snap may be applied directly to the slot 7d—7e for purposes of tying the animal in a stall or other place, the horn marker thus serving not only for purposes of identification of the animal but also dispensing with necessity of providing the animal with the usual expensive leather halter.

Figure 7:
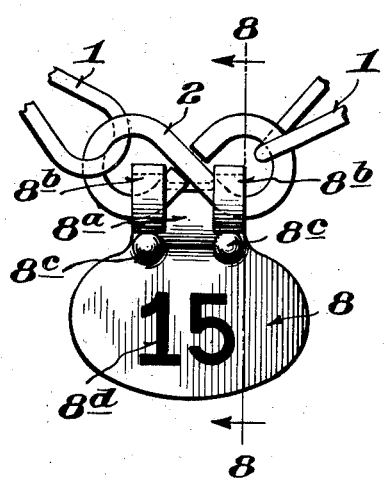
Fig. 7 is a plan view showing a still further modified form of marker plate used with my horn marker.
Figure 8:
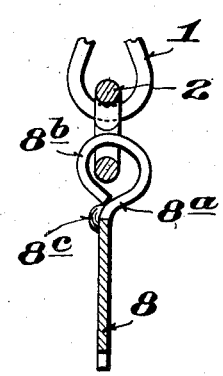
Fig. 8 is a vertical section on the line 8—8, Fig. 7.

In Figs. 7 and 8 a further modification is shown utilizing the neck chain 1, the ends of which are connected together by the S-hook 2. In this modification however the marker plate 8 is provided with indicia 8d, such as "15," which may be permanently applied thereto in any desired manner, and is further provided with an integral shank 8a at its upper edge having tabs rolled to form eyes 8b which are spaced apart a distance corresponding with the spacing of the eyes of the S-hook 2. The eyes 8b of the plate 8 are engaged in the spaced eyes of the S-hook 2, as indicated. Such construction dispenses with the necessity of the interlocking S-hook 6, and the arrangement is such that the marker plate is limited in its lateral shifting movement on the S-hook 2. Preferably knobs 8c are provided on the base of the shank 8a which are contacted by the tips of the rolled eyes 8b of plate 8 to prevent accidental opening of the eyes; but in event one eye 8b should open the marker plate would still remain attached to the S-hook 2 by the other eye 8b. Thus the use of the two eyes 8b forms a double lock for the plate 8 on the S-hook 2.

It is understood that the marker plates, the S-hooks, double hooks or links are not limited to the particular shapes or designs shown in the drawings, but may be altered as desired.

The above markers are durable and the plates will not become loosened and lost. Moreover, the arrangement provides an attractive appearance and insures that the marker plate will remain centered on the cow's forehead, as the construction keeps the chain from creeping laterally or vertically.

When using the chain 1 and the S-hook, double hook or link 2, the marker may be adjusted to suit any spacing of the horns on the cow's head. When once attached one eye of the hook or link 2 may be opened and engaged in a different link of the main horn chain 1 so that the marker is adjustable as the cow or animal grows.

I do not limit my invention to the exact forms shown in the drawings, for obviously changes may be made therein within the scope of the claims.

I claim:
1. A marker for cattle comprising a flexible member adapted to encircle the neck or horns of the animal, a double hook having its eyes secured to the ends of the flexible member respectively; and a marker plate bearing indicia and secured to said hook; said marker plate having a perforation; and a second double hook having one eye engaged in the perforation of the plate and its other eye encircling the central portion of the first hook, thereby forming a clamp to prevent opening of the eyes of the first hook.

2. A marker for cattle having horns comprising a flexible member adapted to encircle the spaced horns; a double hook having its eyes secured to the ends of the flexible member respectively and disposed centrally of the cow's forehead; means on the member for preventing circumferential movement of the member; and a marker plate bearing indicia and secured to said hook; said marker plate having a perforation; and a second double hook having one eye engaged in the perforation of the plate and its other eye encircling the central portion of the first hook, thereby forming a clamp to prevent opening of the eyes of the first hook.

3. A marker for cattle having horns comprising a single loop flexible member adapted to encircle and contact the spaced horns; a double hook having its eyes secured to the ends of the flexible member respectively and disposed centrally of the cow's forehead; an auxiliary member adapted to pass around the inner side of and to contact one horn and having its ends secured in adjacent portions of the flexible member to prevent circumferential movement of the flexible member; and a marker plate bearing indicia and secured to said hook.

4. In a marker as set forth in claim 3, said marker plate having spaced integral eyes respectively engaging the eyes of said hook, the eyes of the plate forming a double hook therefor; and means on the plate resisting opening of the eyes of the plate.

5. In a marker as set forth in claim 3, said marker plate having a perforation; and a second double hook having one eye engaged in the perforation of the plate and its other eye encircling the central portion of the first hook, thereby forming a clamp to prevent opening of the eyes of the first hook.

6. In a marker as set forth in claim 3, said marker plate having a perforation; and a second double hook having one eye engaged in the perforation of the plate and its other eye encircling the central portion of the first hook, thereby forming a clamp to prevent opening of the eyes of the first hook; said plate having a transverse slot adjacent its upper end of less width than the diameter of the material of the eye of the second hook; and said slot having semi-circular recesses at its center forming with the slot the said perforation of the plate receiving the eye of the second hook and maintaining the same centered in the slot.

7. In a marker as set forth in claim 3, said marker plate having a perforation; and a second double hook having one eye engaged in the perforation of the plate and its other eye encircling the central portion of the first hook, thereby forming a clamp to prevent opening of the eyes of the first hook; said plate having transverse slots adjacent its upper and lower ends of less width than the diameter of the material of the eye of the second hook; and said slots having semi-circular recesses at their centers, one of which forms with the slot the said perforation of the plate receiving the eye of the second hook and maintaining the same centered in the slot.

WILLIAM F. SCHACHT.

REFERENCES CITED

The following references are of record in the file of this patent:

UNITED STATES PATENTS

| Number | Name | Date |
|---|---|---|
| 345,600 | Phifer | July 13, 1886 |
| 661,738 | Goolsbey | Nov. 13, 1900 |
| 843,586 | Dean | Feb. 12, 1907 |
| 1,318,821 | Wilson | Oct. 14, 1919 |
| 2,005,649 | Dragoo, Jr. | June 18, 1935 |
| 2,060,921 | Ashton | Nov. 17, 1936 |
| 2,345,292 | Schacht | Mar. 28, 1944 |
| 2,345,293 | Schacht | Mar. 28, 1944 |
| 2,354,617 | Schacht | July 25, 1944 |
| 2,383,419 | Schacht | Aug. 21, 1945 |
| 2,383,718 | Gardell | Aug. 28, 1945 |